(12) United States Patent
Cheng

(10) Patent No.: US 11,220,999 B1
(45) Date of Patent: Jan. 11, 2022

(54) DEEP HYBRID CONVOLUTIONAL NEURAL NETWORK FOR FAULT DIAGNOSIS OF WIND TURBINE GEARBOXES

(71) Applicant: Palo Alto Research Center Incorporated, Palo Alto, CA (US)

(72) Inventor: Fangzhou Cheng, Mountain View, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 0 days.

(21) Appl. No.: 17/010,605

(22) Filed: Sep. 2, 2020

(51) Int. Cl.
*F03D 17/00* (2016.01)
*F03D 80/80* (2016.01)
*G06K 9/62* (2006.01)
*G06N 3/08* (2006.01)

(52) U.S. Cl.
CPC .......... *F03D 17/00* (2016.05); *F03D 80/88* (2016.05); *G06K 9/6256* (2013.01); *G06N 3/08* (2013.01); *F05B 2240/60* (2013.01); *F05B 2260/4031* (2013.01); *F05B 2260/80* (2013.01); *F05B 2270/342* (2020.08); *F05B 2270/709* (2013.01); *F05B 2270/803* (2013.01)

(58) Field of Classification Search
CPC ....... F03D 17/00; F03D 80/88; G06K 9/6256; G06N 3/08; F05B 2240/60; F05B 2260/80; F05B 2260/4031; F05B 2270/709; F05B 2270/803; F05B 2270/342

USPC ...................................................... 290/44, 55
See application file for complete search history.

(56) References Cited

U.S. PATENT DOCUMENTS

| 10,819,844 | B2* | 10/2020 | Kim | H05B 47/115 |
| 2018/0324595 | A1* | 11/2018 | Shima | G06N 3/08 |
| 2019/0319868 | A1* | 10/2019 | Svennebring | H04L 41/147 |
| 2020/0059551 | A1* | 2/2020 | Kim | H04M 1/72454 |
| 2020/0386656 | A1* | 12/2020 | Jung | G06N 20/00 |

\* cited by examiner

*Primary Examiner* — Pedro J Cuevas
(74) *Attorney, Agent, or Firm* — Shun Yao; Park, Vaughan, Fleming & Dowler

(57) ABSTRACT

One embodiment provides a system for facilitating fault diagnosis. During operation, the system collects current signals associated with a physical object which comprises a rotating machine. The system demodulates the collected signals to obtain current envelope signals, which eliminates fundamental frequencies and retains fault-related frequencies. The system resamples the current envelope signals, which converts the fault-related frequencies to constant frequency components. The system enlarges, by a fault-amplifying convolution layer, the resampled envelope signals to obtain fault information. The system provides the fault information as input to a deep convolutional neural network (CNN). The system generates, by the deep CNN, an output which comprises the fault diagnosis for the physical object.

20 Claims, 10 Drawing Sheets

| STRUCTURE | AVERAGE ACCURACY | STANDARD DEVIATION |
|---|---|---|
| DHCNN | 99.54% | 0.25% |
| DCNN1 | 94.04% | 3.14% |
| DCNN2 | 98.29% | 0.26% |
| ANN | 98.07% | 0.44% |

FIG. 5B

DEEP HYBRID CONVOLUTIONAL NEURAL NETWORK FOR FAULT DIAGNOSIS OF WIND TURBINE GEARBOXES

FIELD

This disclosure is generally related to machine learning and data classification. More specifically, this disclosure is related to a deep hybrid convolutional neural network for fault diagnosis of rotating machines, such as wind turbines and associated gearboxes.

RELATED ART

Machine learning algorithms have been applied in the broad class of rotating systems. One exemplary dataset is in the operation of wind turbines. In rotating machines, certain features such as manufacturing, energy, and transportation may be monitored. Failures in these areas, e.g., as related to one or more components of a rotating machine, may result in an increase in cost due to a significant downtime as well as an increase in accidents and related safety issues. Thus, rotating machines may benefit from a system which can predict issues as they begin to occur (e.g., a "soft fault") and prior to a "hard" fault.

One issue in detecting soft faults relates to the manner in which sensor data may be gathered. For example, in a rotating machine system, data may be obtained from a sensor at a first location, which may be at a close or far distance from another sensor which is integrated into the system at a different location. A faulty signal may be obscured by or hidden among other operational features, thereby making the faulty signal difficult to detect.

Thus, the efficient detection of soft faults, including detecting and analyzing the associated faulty signals from various sensors, remains a challenge in the area of machine leaning for fault diagnosis of rotating machine systems, e.g., wind turbines.

SUMMARY

One embodiment provides a system for facilitating fault diagnosis. During operation, the system collects current signals associated with a physical object which comprises a rotating machine. The system demodulates the collected signals to obtain current envelope signals, which eliminates fundamental frequencies and retains fault-related frequencies. The system resamples the current envelope signals, which converts the fault-related frequencies to constant frequency components. The system enlarges, by a fault-amplifying convolution layer, the resampled envelope signals to obtain fault information. The system provides the fault information as input to a deep convolutional neural network (CNN). The system generates, by the deep CNN, an output which comprises the fault diagnosis for the physical object.

In some embodiments, the rotating machine comprises one or more of: a wind turbine; a wind turbine gearbox; a machine which includes a rotating shaft; and a machine which includes one or more rotating components and at least one component from which current signals can be collected or obtained.

In some embodiments, demodulating the collected signals, resampling the current envelope signals, enlarging the resampled envelope signals, and providing the fault information as input to the deep CNN are performed by a physics-based module.

In some embodiments, demodulating the collected signals is performed by an amplitude demodulation module of the physics-based module and is based on a Hilbert transform. The retained fault-related frequencies are non-stationary fault-related frequencies.

In some embodiments, resampling the current envelope signals is performed by an angular resampling module of the physics-based module and is based on an angular resampling algorithm. The angular resampling algorithm is based on an order tracking method, and the resampled envelope signals have equal phase increments in an angle domain, thereby eliminating spectrum smearing.

In some embodiments, the physics-based module includes the fault-amplifying convolutional layer. Enlarging the resampled envelope signals further comprises: building, by the fault-amplifying convolution layer, kernels based on amplitudes corresponding to the constant frequency components; and extracting features by measuring similarities between the kernels and a local input signal.

In some embodiments, the system provides the fault information as input to the deep CNN by performing a fast Fourier Transform (FFT) analysis on the enlarged resampled envelope signals. The fault information provided to the deep CNN comprises magnitudes of a predetermined frequency range. The predetermined frequency range is configured by a system or a user associated with the rotating machine.

In some embodiments, the deep CNN processes the fault information based on zero padding, batch normalization, and a plurality of pooling layers subsequent to a plurality of convolutional layers.

In some embodiments, the deep CNN processes the fault information further based on two fully-connected layers by using a softmax function to determine conditional probabilities for a health condition of the rotating machine. The fault diagnosis includes a fault classification related to the health condition of the rotating machine.

BRIEF DESCRIPTION OF THE FIGURES

FIG. 5B depicts a table with a comparison of accuracy and standard deviation of four different methods, in accordance with an embodiment of the present application.

In the figures, like reference numerals refer to the same figure elements.

DETAILED DESCRIPTION

Figure 1:
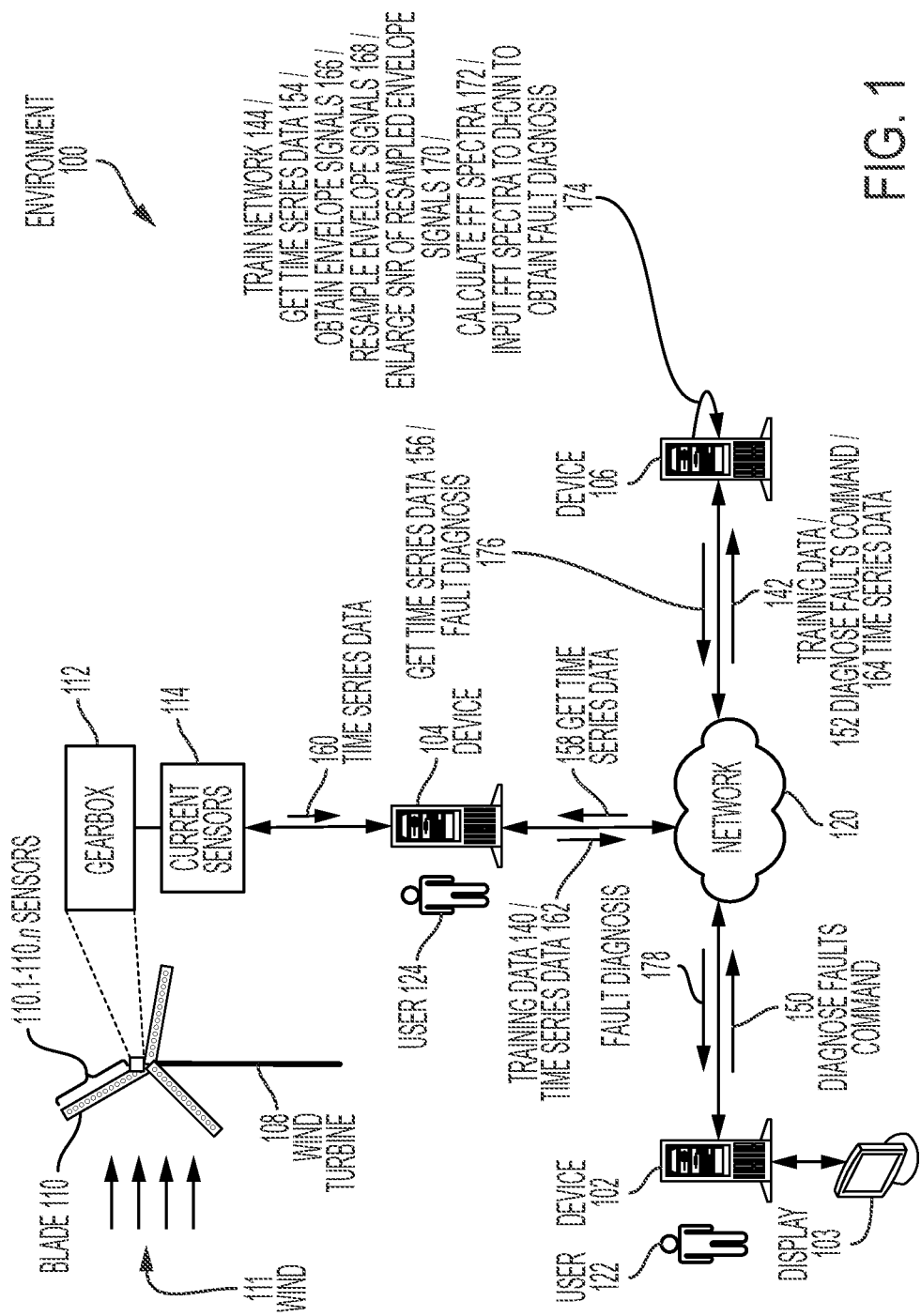
FIG. 1 presents an exemplary environment which facilitates fault diagnosis, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

High-Level Overview

The embodiments described herein provide a system for improving the accuracy and robustness of fault diagnosis of a rotating machines system using a deep hybrid convolutional neural network.

As described above, failures related to one or more components of a rotating machine may result in an increase in cost due to a significant downtime as well as an increase in accidents and related safety issues. Thus, rotating machines may benefit from a system which can predict issues as they begin to occur (e.g., a "soft fault") and prior to a "hard" fail. One issue in detecting soft faults relates to manner in which sensor data may be gathered. For example, in a rotating machine system, data may be obtained from a sensor at a first location, which may be at a close or far distance from another sensor which is integrated into the system at a different location. A faulty signal may be obscured by or hidden among other operational features, thereby making the faulty signal difficult to detect.

Thus, the efficient detection of soft faults, including detecting and analyzing the associated faulty signals from various sensors, remains a challenge in the area of machine leaning for fault diagnosis of rotating machine systems, e.g., wind turbines.

The embodiments described herein address these challenges by providing a system with two modules: a physics-based module which provides amplitude demodulation, angular resampling, and fault amplification to obtain fault information; and a deep convolutional neural network (CNN) which incorporates the fault information from the physics-based module and captures more comprehensive features for fault diagnosis. While the embodiments described herein refer to a wind turbine as an exemplary rotating machine (and specifically to the gearbox associated with a wind turbine and overall rotating machine system), the embodiments may apply to any rotating machine system and associated components, and are not limited to wind turbines, wind turbine gearboxes, or any components or systems associated with wind turbines.

The cost for operation and maintenance can contribute a significant portion of the levelized cost of electricity (LCOE) produced by wind turbines. For example, inspection and maintenance costs may account for 10-15% of LCOE for an onshore wind turbine, and may account for up to 40% of LCOE for an offshore wind turbine. One essential component in a wind turbine is the gearbox. Failures associated with the gearbox can result in significant downtime of wind turbines and financial losses. Thus, the effective and efficient fault diagnosis of wind turbine systems and components, such as gearboxes, can achieve an improvement in system availability, safety, and reliability, and can also reduce downtime and maintenance costs.

One technique for fault diagnosis of wind turbine gearboxes is using generator current signals. These "current-based" techniques can provide some advantages over the widely used vibration-based techniques. First, since current signals have already been used in wind turbine control systems, there is no need to install additional sensors or data acquisition devices. This can reduce the cost and complexity of implementing current-based methods. Second, current-based fault diagnosis methods can potentially be integrated into the supervisory control and data acquisition system or control system to automatically trigger appropriate alarms when a problem occurs. This feature can be essential for unattended wind turbine operation, particularly in remote or inaccessible locations. Third, current signals are generally less sensitive to environmental noise and sensor location compared to vibration signals. Current signals can be recorded at the bottom of tower, which is easily accessible and nonintrusive to the wind turbines.

While current-based techniques may provide fault diagnosis of wind turbine gearboxes, some challenges remain for extracting useful fault features from current signals for gearbox fault diagnosis. First, a current signal can include the fundamental component and the fault-related components. The fault-related components are modulated with the fundamental component, which is the dominant component and is typically much larger than the fault-related components. When describing a "signal-to-noise" (SNR) ratio, "signal" can correspond to the fault-related components, while "noise" can correspond to the other components, including the fundamental component. Current signals generally have very low signal-to-noise ratios (SNRs), which can make it difficult to extract the fault features, especially for pure data-driven methods.

Moreover, due to the varying shaft rotating speed of a wind turbine, the signals collected from the condition-monitoring system of a gearbox are usually non-stationary. Thus, the fault-related information (i.e., fault characteristic frequencies) often changes with time in the collected signal. Therefore, advanced signal processing algorithms may be required to identify and extract useful fault features.

After fault features are identified and extracted from the collected sensor signals, a machine learning technique such as a support vector machine (SVM) and artificial neural network (ANN) can be applied to detect and classify the faults associated with the gearbox. Deep learning algorithms may be used for different fault diagnosis applications, and can be trained to adaptively learn high-level features of inputs through multiple non-linear and special operations. This can result in mitigating some of the inherent disadvantages of traditional machine learning algorithms.

Convolutional neural networks (CNNs) are one of the most powerful deep learning algorithm and may be adopted for fault diagnosis purposes. Some conventional CNNs are designed as one-dimensional (1-D) structures to process data directly, and to facilitate the analysis of 1-D sensor data. For example, some conventional CNNs can utilize raw current data as the input, and can use the 1-D CNN to integrate the feature extraction and classification together for real-time motor fault detection. Other conventional CNNs can learn features directly from the frequency spectrum of vibration signals for condition-monitoring of a gearbox.

However, although conventional CNNs have achieved progress in fault diagnosis applications, existing CNNs and associated methods still face certain challenges. One challenge is that most of the conventional CNNs use a pure data-driven framework which does not consider physical knowledge in designing the CNN structure. This may result in losing key fault information, especially in the scenario where the data has a very low SNR, e.g., current signals in wind turbines. Another challenge is that the CNN structure is essential to obtain desirable fault diagnosis results. Unlike image recognition, the hyperparameters of CNN should be carefully tuned based on the property of the input signals and features. This can be critical in order to achieve more accurate and robust diagnosis results in fault diagnosis applications.

The embodiments described herein address these challenges by providing a system which comprises a deep hybrid convolutional neural network (DHCNN) for fault diagnosis of a wind turbine gearbox using current signals. The current signals can include three-phase stator and rotor currents. The system includes two modules. The first module is a physics-based module which provides amplitude demodulation (e.g., via a Hilbert transform), angular resampling, and fault amplification to obtain fault information. The second module is a deep convolutional neural network (CNN) which incorporates the fault information from the physics-based module and captures more comprehensive features for fault diagnosis.

The physics-based module can result in improving the SNR of the current signals, and can further provide more fault information from the physical perspective. In the amplitude demodulation portion of the physics-based module, the system can use the Hilbert transform to demodulate the collected current signals to obtain its "current envelope signals" or "envelope." This can eliminate the dominant fundamental frequency while retaining non-stationary fault-related frequencies.

The system, via the physics-based module, can use an angular resampling algorithm to resample the current envelope signals, to convert the non-stationary fault-related components to constant frequency components in the "resampled envelope signals." Subsequently, the system, via a fault-amplifying portion of the physics-based module, can enlarge or amplify the resampled envelope signals. The fault-amplifying portion can be a convolution layer, and can build kernels. The fault characteristic frequency can determine the kernel size and number of filters, which eliminates the need to be trained and optimized in order to determine relevant information. This can also reduce the computational cost in the learning process. Thus, the system can suppress the fundamental rotational frequency, and subsequently amplify the higher harmonics, where the fault features may generally be buried.

The second module is the deep CNN module. The system can calculate the fast Fourier transform (FFT) of the six convolved signals respectively, and can feed the FFT spectra as a deep 1-D CNN in parallel for fault diagnosis. The overall system can include both the physics-based module and the deep CNN module, and can be referred to as a deep hybrid CNN (DHCNN). The DHCNN can utilize a feature-level sensor data fusion concept to capture more abundant data and a robust health state of the wind turbines. The hyperparameters can be well-tuned and batch normalization can be adopted for the effective training of the DHCNN. The effectiveness and superiority of the described embodiments can be validated by different gearbox faults in a doubly-fed induction generator (DFIG)-based wind turbine drive-train test bed.

Background of Fault Characteristic Frequencies, Amplitude Demodulation, Angular Resampling, and a Standard CNN Fault Characteristic Frequencies in Current Signals Mechanical faults in a gearbox can be identified in the current signals based on the electromechanical coupling between the gearbox and the generator. The vibrations at the fault-related frequencies of the gear, i.e., shaft rotating frequencies, can modulate the current signals. In a doubly-fed induction generator (DFIG) system, the power electronic interface can control the rotor currents to achieve the variable speed necessary for maximum energy capture in variable winds. For DFIG currents, in the one phase stator/rotor current, the fault characteristic frequency components exist at $f \pm f_i$ (i=1, 2, 3, . . . ), where f is the fundamental frequency of the current signal and f is a vibration characteristic frequency of gear fault. In a gearbox of DFIG-based wind turbines, $f_i$ is proportional to the shaft rotating frequency $f_r$, where f of stator currents are constant at 60 Hz and f of rotor currents are equal to $(60 \pm f_r)$ Hz, depending on the operation mode. During operation of the DFIG-based wind turbines operation, amplitudes at $f \pm f_i$ may be observed to be different from the level or amplitudes observed in a healthy condition. This can indicate that a gear fault may occur in the gearbox and can induce additional vibrations at the frequencies $f_i$. Thus, these frequency amplitudes may be used as effective fault features for gear fault diagnosis.

However, the amplitudes of such fault characteristic frequency components are generally much smaller than the fundamental frequency in the current signals, which can lead to a low SNR. Thus, the challenge remains to improve the SNR of the fault-related components. Furthermore, because wind turbines operate with a time-varying shaft rotating frequency due to variations of wind velocity and direction, the fault characteristic frequencies in currents are neither constant nor proportional to $f_r$. This is another challenge, and also indicates that further signal processing may be needed for better fault feature extraction.

Amplitude Demodulation

To eliminate the fundamental frequency and increase the SNR, the described embodiments can use amplitude demodulation to extract the envelope signal e(t) of a current signal. The Hilbert transform can be used for amplitude demodulation and can correspond to a 90 degree phase shift in the time domain. The Hilbert transform of one phase current signal, e.g., $i_a(t)$, denoted by $H[i_a(t)]$, can be defined by an integral transform as follows:

$$H\{i_a(t)\} = \frac{1}{\pi} \int_{-\infty}^{\infty} \frac{i_a(\tau)}{t - \tau} d\tau \qquad \text{Equation (1)}$$

The envelope signal e(t) can be defined as:

$$e(t) = \sqrt{[i_a(t)]^2 + [H\{i_a(t)\}]^2} \qquad \text{Equation (2)}$$

The envelope signal e(t) can eliminate the fundamental frequency component while still retaining fault vibration characteristic frequencies that are proportional to $f_r$.

Angular Resampling

Angular resampling is a technique which can solve the spectrum smearing problem of signals from wind turbines operating in variable shaft speed conditions. The general idea of angular resampling is to resample a fixed-sampling rate signal into a signal with fixed phase intervals in the phase domain. Angular resampling has a relatively higher resolution in the frequency domain than the time-frequency-domain analysis method, and can therefore be more effective in extracting the frequency-domain fault features. An order tracking-based method can be used to achieve angular resampling for the obtained envelope signal e(t) after amplitude demodulation. The obtained resampled envelope signal eV) can have equal phase increments in the angle domain and, therefore, no longer has the spectrum smearing problem. Thus, conventional spectrum analysis can be conducted on the resampled signal for feature extraction Architecture of a Standard CNN A convolutional neural network (CNN) is a multi-stage feed-forward neural network, which typically consists of multiple convolutional layers, pooling layers, and fully-connected layers. These layers can be used to accomplish the tasks of feature learning and classification. The embodiments described herein focus on the 1-D CNN because the inputs of the CNN are 1-D current signals.

The convolutional layer can convolve the input 1-D vector as a set of kernels $w^l \in R^{J \times H \times I}$ and can subsequently perform the activation operation to generate the output features, where J is the number of kernels, H is the fixed length of each kernel, and I is the number of channels (depth) in the kernel. The kernels can be used to extract the local features within a local region of the inputs.

The output feature vector $z_j^{l+1}$ can be expressed as:

$$z_j^{l+1} = \sigma(\Sigma_i x_i^l * w_{ij}^l + b_j^{l+1}) \quad \text{Equation (3)}$$

where: $\sigma(\cdot)$ is the activation function, such as sigmoid and Rectified Linear Unit (ReLU); $x_i^l$ is the ith feature channel in the lth layer; $w_{ij}^l$ is the kernel with length of H; and $b_j^{l+1}$ is the bias vector in the layer, where j=1, 2, ..., J and i=1, 2, ..., I. The trainable parameters in the convolutional layers are the weights of the kernels $w_{ij}^l$, and the hyperparameters are H and I.

A pooling layer can usually be stacked after a convolutional layer in the CNN architecture. The pooling layer can function as a down-sampling operation which reduces the size of the features and the parameters of CNN, and thus, can decrease the training time and memory requirements, and can further control the overfitting. One commonly used pooling function is "max pooling," which extracts the maximum value of local regions of the input features.

The fully-connected layers are the last few of layers in the CNN structure. The fully-connected layers can flatten the learned features from previous layers and can be used for classification purposes.

Overview of DHCNN with Physics-Based Module

The embodiments described herein provide an improvement over existing deep learning architecture for fault diagnosis, as described above. The described embodiments provide a system which includes a DHCNN with two modules: a physics-based module and a deep CNN module. The system collects the three-phase stator and rotor current signals from wind turbine generator terminals. The system, via the physics-based module, works on the collected signals to enhance the SNR for better diagnosis results. Specifically, the system can use a Hilbert transform-based amplitude demodulation algorithm to eliminate the current fundamental frequency and to extract the envelope signal. Next, the system can use an angular resampling method to convert the non-stationary envelope signal in the time domain to a stationary signal in the angle domain. Subsequently, the system can use a fault-amplifying convolutional layer based on vibration characteristic frequencies $f_i$ of gearbox faults to increase the SNR for feature extraction. Finally, the system can perform an FFT analysis to convert the signals from the time domain to the frequency domain due to the potential time delays between input signals and different kernel sizes in the fault-amplifying convolutional layer. This can also significantly reduce the input size to the deep CNN module. The FFT spectra can be provided to or served as inputs to the deep CNN module, which contains multiple convolutional layers, batch normalization, max pooling layers, and fully-connected layers.

Detailed Overview of Physics-Based Module

After the system performs amplitude demodulation and angular resampling, the obtained resampled envelope signal e'(t) is a stationary signal, in which the characteristic frequencies $f_i$ are converted to a constant value (i=1, 2, ... ) in the frequency-domain spectrum of e'(t). The amplitudes at these frequencies can be used to build kernels in the fault-amplifying convolutional layer ("Conv0").

This convolutional layer aims to extract the features by measuring the similarities between the kernels and the local input signal. Thus, the kernels for fault diagnosis application should help identify whether an input signal has a large magnitude at fault characteristic frequencies. It is known that well-trained kernels in the convolutional layers of a CNN can be a set of filters that have single or multiple characteristic frequencies. Thus, in the described embodiments, the physics-based convolutional layer Conv0 can be designed to contain constant fault frequencies and should be able to increase their magnitude in the occurrence of faults.

Assume that the gearbox faults have $n_f$ identical fault characteristic frequencies. Then, $n_f$ kernels are designed such that each kernel contains four consecutive periods of one sinusoidal waveform with a constant fault characteristic frequency $f_i'$. The convolution operation of two signals in the time domain can correspond to a multiplication in the frequency.

Consider the Fourier Transform of the signal e'(t) and a kernel $c_0(t)$ in Conv0 are $E'(j\omega)$ and $C_0(j\omega)$, respectively:

$$\mathcal{F}[e'(t) * c_0(t)] = \int_{-\infty}^{\infty} \left[ \int_{-\infty}^{\infty} e'(\tau) c_0(t-\tau) d\tau \right] e^{-j\omega t} dt = \quad \text{Equation (4)}$$

$$\int_{-\infty}^{\infty} e'(\tau) e^{-j\omega \tau} \left[ \int_{-\infty}^{\infty} c_0(t-\tau) e^{-j\omega(t-\tau)} d(t-\tau) \right] d\tau =$$

$$X(j\omega) Y(j\omega)$$

where $\mathcal{F}$ is the Fourier transform operation. The system can use the Fourier transform by convolving it with the kernel, which is designed to amplify the fault frequency. That is, the Fourier transform domain can become a multiplier, e.g., as seen in the design of the kernel function to amplify $Y(j\omega)$. Thus, the magnitude of fault characteristic frequencies can be amplified after layer Conv0 and, as a result, the system can improve the SNR of the signals.

Because for $f_i'$ different faults can typically vary from a few Hz to hundreds of Hz, the lengths of kernels in Conv0 may vary a significant amount. The system can conduct the FFT analysis after Conv0, and can use as input to the CNN only the magnitudes of a selected frequency range in FFT spectrum.

Overview of Deep CNN Module

Figure 2:
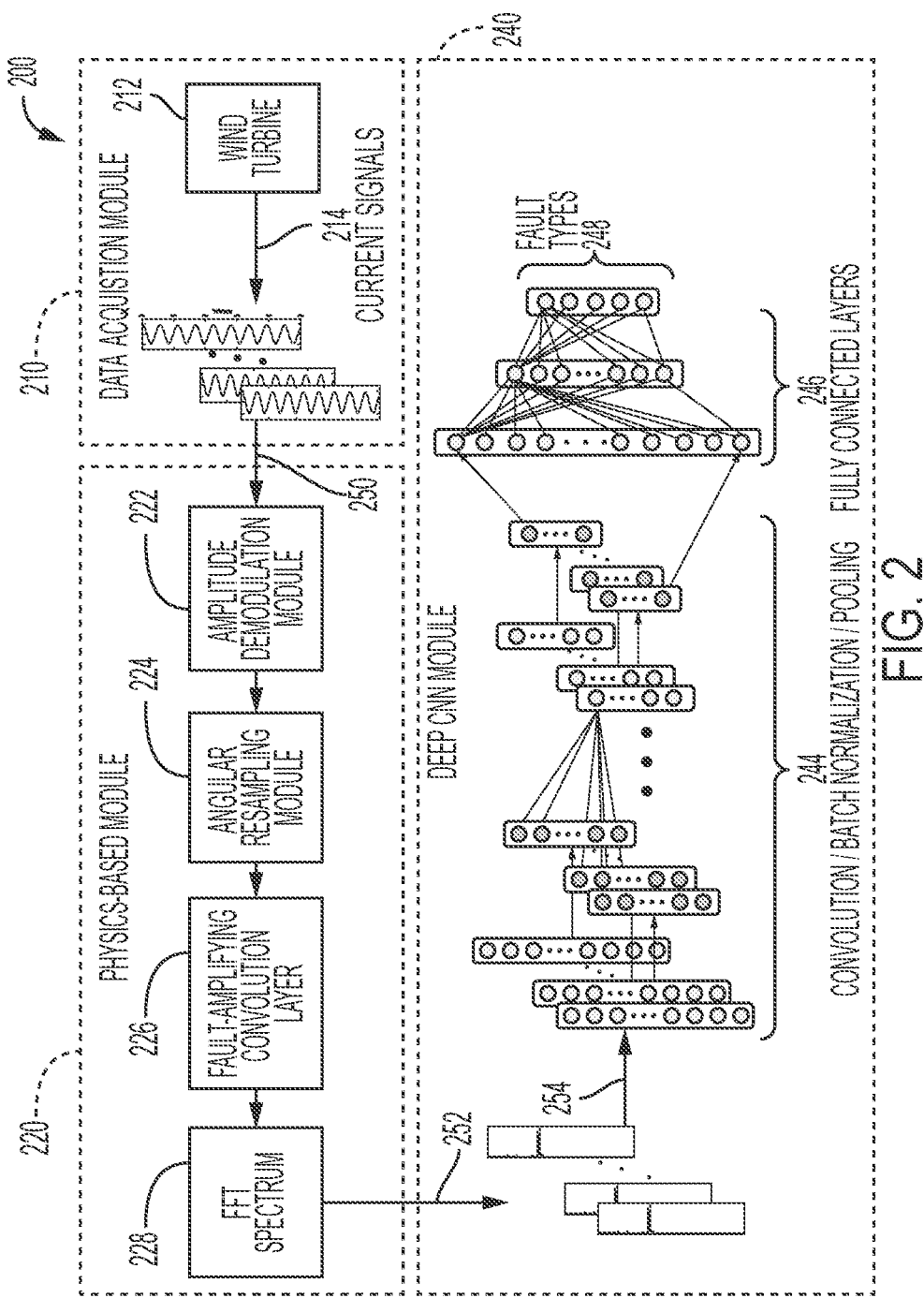
FIG. 2 illustrates an exemplary architecture of a deep hybrid convolutional neural network (DHCNN) and a physics-based module, in accordance with an embodiment of the present application.

As depicted in the overall structure of DHCNN in FIG. 2, the outputs of the physics-based module are the FFT spectra of preprocessed signals, which are fed into the deep CNN module. The CNN module can include four blocks of convolutional layers, batch normalization, and maximum pooling layers, which gradually decrease the dimension of the input tensors while increasing the number of channels. Subsequently, the DHCNN can apply flattening and two fully-connected layers for fault diagnosis.

The first block is explained as an example to introduce the structure designed in the DHCNN module. In the convolutional layer ("Conv1"), the system can use zero padding to maintain the size of input as constant after the convolution operation. ReLU can be selected as the activation function omega since it can accelerate the convergence of the training process using a back-propagation learning method. The system can add batch normalization in Conv1 between the convolution and activation functions to reduce the internal co-variance shift of CNN and to accelerate the training process. The system can stack the max pooling ("Pool1") layer after Conv1, which can determine the maximum value of adjacent points and can further reduce the output dimension.

In the DHCNN, the fault classification stage can be composed of two fully-connected layers by taking the flattened fault features learned from previous layers. The system can use, e.g., a softmax function to determine the conditional probabilities $O_j$ for jth gearbox health condition:

$$O_j = \frac{e^{(\theta(j)x)}}{\sum_{j=1}^{n} e^{(\theta(j)x)}}$$

where n is the number of different health conditions, θ is the parameter which needs to be learned in the layer, and $$f_i' \sum_{j=1}^{n} O_j = 1.$$

The fault type with the largest $O_j$ can be determined or identified as the diagnosis result.

In the training stage, the loss function can be defined as the categorical cross-entropy between the estimated softmax output probability distribution and the actual class. The system can apply the Adam stochastic optimization algorithm to minimize the loss function.

Detailed Description of Exemplary Environment for Facilitating Fault Diagnosis

FIG. 1 presents an exemplary environment 100 which facilitates fault diagnosis, in accordance with an embodiment of the present application. Environment 100 can include: a device 102, an associated user 122, and an associated display 103; a device 104 and an associated user 124; and a device 106. Device 102 can be a client computing device, e.g., a laptop computer, a mobile telephone, a smartphone, a tablet, a desktop computer, and a handheld device. In addition, devices 102, 104, and 106 can be, e.g., a computing device, a server, a networked entity, and a communication device. Devices 102, 104, and 106 can communicate with each other via a network 120. Environment 100 can also include a physical object with components which rotate and generate currents or signals. For example, the physical object can be a wind turbine 108 with multiple blades, such as a blade 110 with multiple sensors 110.1-110.n. Each sensor can record and transmit data to another device. Wind turbine 108 can include a gearbox 112 and current sensors 114, which can detect generated signals, e.g., three-phase stator and rotor currents generated by a doubly fed induction generator (DFIG) or a wound rotor induction generator (WRIG) associated with gearbox 112 (as described below in relation to FIGS. 3A and 3B).

During operation, device 104 can send training data 140 to device 106 via network 120. Device 106 can receive training data 140 (as training data 142) and train a deep CNN based on training data 142 (via a train network 144 operation). Training data 140 can be sent from device 104 or another device (not shown) to device 106, at periodic intervals, or in response to a command from a device (e.g., 102, 106, or another device). Subsequently, device 102, via user 122, can send a diagnose faults command 150 to device 106, where command 150 is a request for fault characteristic information related to a physical object, physical component, or physical system, such as wind turbine 108 (or specifically, a component within gearbox 112 of wind turbine 108).

Device 106 can receive diagnose faults command 150 (as a diagnose faults command 152), and perform a get time series data 154 operation to generate a get time series data 156 message destined for device 104. Device 104 can receive the get time series data 156 message (as a get time series 158 message). Current sensors 114 can send time series data 160 to device 104 based on a request (not shown) from device 104. Current sensors 114 can also send time series data 160 to device 104, at periodic intervals based on a first predetermined threshold or continuously based on a second predetermined threshold. Device 104 can send time series data 160 (as time series data 162) back to device 106.

Device 106 can receive time series data 162 (as time series data 164), and can subsequently perform the following operations. Device 106 can perform an obtain envelope signal 166 operation, e.g., demodulate the collected time series data 164 (the "signals") to eliminate fundamental frequencies and retain non-stationary fault-related frequencies. Device 106 can perform a resample envelope signals 168 operation, e.g., to convert the non-stationary fault-related components to constant frequency components. Device 106 can perform an enlarge SNR of resample envelope signals 170 operation, e.g., wherein a fault-amplifying convolutional layer amplifies the faults and builds kernels based on amplitudes at the constant frequency. Device 106 can perform a calculate FFT spectra 172 operation, and subsequently perform an input FFT spectra to DHCNN to obtain fault diagnosis 174 operation. Device 106 can return a fault diagnosis 176 to device 102.

Device 102 can receive fault diagnosis 176 (as a fault diagnosis 178), and can cause to be displayed on display 103 information related to the fault characteristics. Exemplary display information can include: information relating to the physical object (wind turbine 108); a specific design or component architecture of gearbox 112; time series data 160; FFT spectra 172; a classification or a fault type; other information indicating the fault type and one or more components associated with the indicated fault type.

In the embodiments described here, the output of the DHCNN is a fault diagnosis, which can include not only an identification of the presence or absence of a fault, but also, in the case of the presence of a fault, the type of fault. That is, the system can provide a classification of the type of fault detected, as shown above in relation to fault types 248 of FIG. 2 and fault types 370 of FIG. 3B. The fault diagnosis can be returned to a requesting user, and displayed in the form of various information on a display screen associated with the requesting user, as described above in relation to fault diagnosis 178 and display 103 of FIG. 1. In the exemplary rotating machine system of a wind turbine, the fault diagnosis can be used by any other person or group of persons who may be interested in or require information about the physical asset or rotating machine system (e.g., the wind turbine), also referred to as an "interested entity" or "interested entities."

For example, a maintenance technician may use a fault diagnosis which classifies a particular gear with a particular fault (e.g., Gear 2 with a two teeth missing (TTM) fault) to replace the particular gear or set of gears relating to the particular gear. Another interested entity can include a plant owner, who can use the fault diagnoses at a high level to deal more efficiently with issues relating to the overall plant and its components. Other interested entities can include power grid operators, who may use a fault diagnosis or a set of fault diagnoses to plan for other needs in obtaining energy (e.g., if a particular fault diagnosis or set of fault diagnoses affects the ability of the wind turbine to provide the expected amount of power). Another interested entity can include a manufacturing lead or user associated with a system which includes the wind turbine. This entity can use the fault diagnosis to plan for maintenance during an off-peak production cycle, e.g., to plan for the timing of production so that or if production is not dependent upon the rotating machines.

The fault diagnosis output by the system can be fed into an operational dashboard or other graphical user interface (GUI) for any of the above-listed exemplary interested entities. A respective interested entity can be a user (such as user 122 of FIG. 1) who generates and sends the command to diagnose the faults (e.g., command 150 of FIG. 1). The system can display the identification, classification, and other pertinent information of the fault diagnosis on a display screen associated with the user (e.g., display 103 of FIG. 1) ("detected fault"). Based on the fault diagnosis output for the detected fault, the user can perform remedial actions to address the diagnosed or detected fault. The user can subsequently use the operational dashboard or the GUI (e.g., by pressing a widget or other actionable button or widget) to generate another command to diagnose the faults to determine whether the performed remedial action sufficiently addressed the detected fault. Thus, the described embodiments provide an improvement in the classification of faults in a rotating machine system (such as a wind turbine and in an associated gearbox) by using the DHCNN with the physics-based module which includes the fault-amplifying layer.

FIG. 2 illustrates an exemplary architecture 200 of a DHCNN and a physics-based module, in accordance with an embodiment of the present application. Architecture 200 can include: a data acquisition module 210; a physics-based module 220; and a deep CNN module 240. During operation, data acquisition module 210 can obtain time series data by monitoring, observing, and detecting current signals 214 as generated from a physical object (e.g., a wind turbine 212 or a signal-generating component associated with wind turbine 212). Current signals 214 can be represented as time series data. Data acquisition module 210 can transmit current signals 214 as time series data (via a communication 250) to physics-based module 220.

Physics-based module 220, via an amplitude demodulation module 222, can receive current signals 214 as time series data. Amplitude demodulation module 222 can demodulate the collected current signals to obtain current envelope signals, which can eliminate the fundamental frequencies and retains the non-stationary fault-related frequencies. Next, an angular resampling module 224 can resample, based on an angular resampling algorithm, the current envelope signals to convert the non-stationary fault-related components to the constant frequency components. Subsequently, a fault-amplifying convolutional layer 226 (denoted as "Conv0" in this disclosure) can enlarge the resampled envelope signals and build kernels based on amplitudes at the constant frequency. FFT spectrum 228 module can conduct the FFT analysis of the enlarged or amplified envelope signals, and can provide as input to deep CNN module 240 only the FFT spectrum with magnitudes of a selected frequency range.

The output of FFT spectrum 228 module can be transmitted to deep CNN module 240 via a communication 252. This FFT spectra is further provided as input to convolution/batch normalization/pooling layers 244 of deep CNN module 240, via a communication 254. Subsequent to, e.g., four of the convolution and pooling layers, deep CNN module 240 can process the data via, e.g., two fully connected layers 246. Finally, deep CNN module 240 can provide fault types 248 as its output, which can be returned to a requesting device or associated user for display and further analysis on a display screen of the requesting device or user, as described above in relation to FIG. 1. The further analysis can include user actions to repair or otherwise address the diagnosed faults as relating to any associated physical components of the rotating-shaft system.

Exemplary Data Set and Results Using Physics-Based Module

Exemplary Environment: Wind Turbine Emulator

Figure 3A:
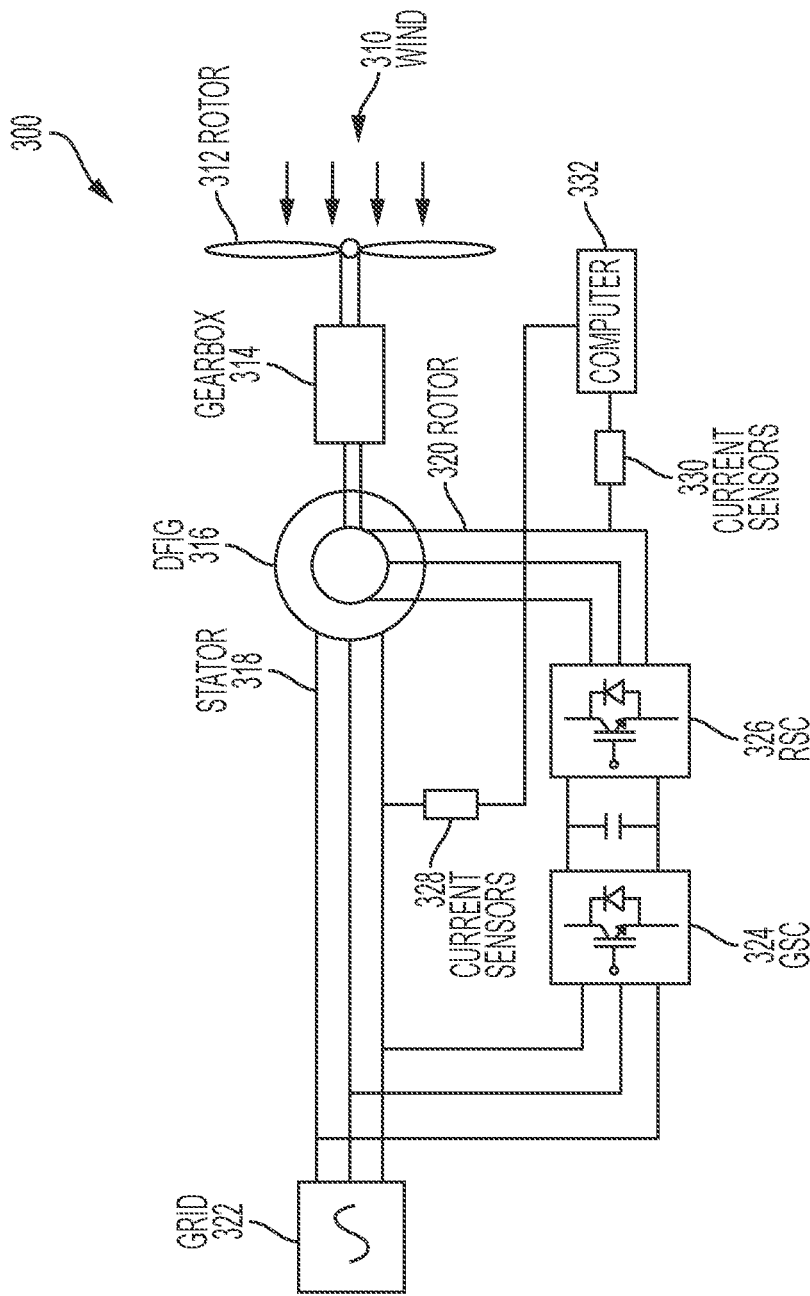
FIG. 3A illustrates an exemplary environment for using a physics-based module, in accordance with an embodiment of the present application.

FIG. 3A illustrates an exemplary environment 300 for using a physics-based module, in accordance with an embodiment of the present application. Environment 300 can depict a system with a wind turbine emulator to demonstrate the DHCNN for fault diagnosis. Environment 300 can be driven by a wind 310 and a rotor 312. For example, an induction motor driven by a variable frequency alternating current (AC) drive can be employed as the prime mover, together with a stepdown gearbox 314, which reduces the shaft rotating frequency of the induction motor (e.g., doubly fed induction generator (DFIG) 316 or wound rotor induction generator (WRIG) 350 of FIG. 3B). This can emulate the dynamics of a wind turbine rotor. Another two-stage helical gearbox (e.g., two-stage helical gearbox 360 of FIG. 3B) can be used to emulate the gearbox in the drivetrain with some artificially generated faults and connects to DFIG 316 with two pole pairs.

Stator 318 of DFIG 316 can be connected to a programmable AC source (shown as a grid 322), which can be used to emulate the power grid. Rotor 320 of DFIG 316 can be connected to the same AC source (e.g., grid 322) through two back-to-back connected three-phase insulated-gate bipolar transistor (IGBT) power converters, which are a rotor side converter (RSC) 326 and a grid side converter (GSC) 324, respectively. The system can record the signals used by the DFIG control scheme, including three-phase rotor currents, using, e.g., a dSPACE 1005 board (not shown) at a sampling frequency of 5 kHz.

A position encoder (e.g., an encoder 356 of FIG. 3B) with a resolution of 4096 cycles per revolution can be mounted on an input shaft of DFIG 316 to measure the shaft rotating frequency $f_r(t)$. The shaft rotating frequency can change randomly and can generally lie within ±20% of the synchronous rotating frequency to meet the operating requirements of DFIG 316.

Figure 3B:
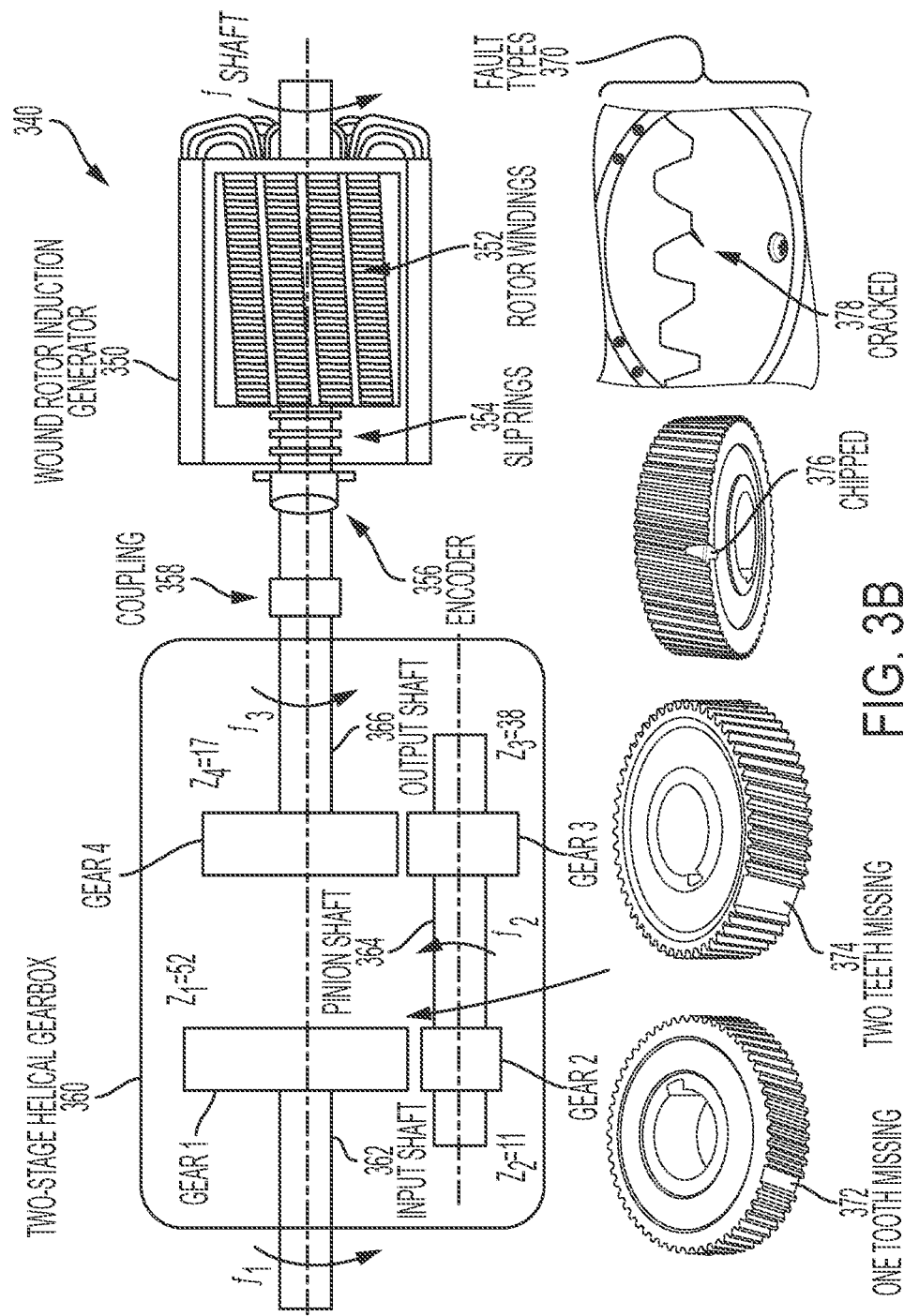
FIG. 3B illustrates an exemplary environment for using a physics-based module, in accordance with an embodiment of the present application.

FIG. 3B illustrates an exemplary environment 340 for using a physics-based module, in accordance with an embodiment of the present application. Environment 340 can include wound rotor induction generator (WRIG) 350 and two-stage helical gearbox 360, joined by a coupling 358. WRIG 350 can include rotor windings 352 and slip rings 354, as well as encoder 356. Two-stage helical gearbox 360 can include: four gears (labeled as "Gear 1," "Gear 2," "Gear 3," and "Gear 4"); an input shaft 362; a pinion shaft 364; and an output shaft 366. Each labeled gear corresponds to a certain number $z_x$ of teeth. For example: Gear 1 has 52 teeth ($z_1$=52); Gear 2 has 11 teeth ($z_2$=11); Gear 3 has 38 teeth ($z_3$=38); and Gear 4 has 17 teeth ($z_4$=17). Each gear can correspond to, e.g., one of four fault types 370 of exemplary faulty test gears: one tooth missing (OTM) 372; two teeth missing (TTM) 374; chipped 376; and cracked 378.

The gear fault characteristic frequencies, i.e., the three shaft rotating frequencies, can be expressed by the following equations:

$$f_1 = \frac{z_2}{z_1} f_2 = \frac{z_3}{z_1} \frac{z_4}{z_3} f_3 \qquad \text{Equation (5)}$$

Since $f_r(t)=f_3(t)$, the constant (i=1, 2, 3) in e'(t) can be derived to be 2.84 Hz, 13.42 Hz, and 30 Hz, respectively. The number of kernels $n_f$ in Conv0 can be determined to be 3 as well. The exemplary dataset and results can cover five different gearbox fault types. One fault type is the test gearbox in the healthy condition and the other four fault types are the test gearbox with a one-tooth-missing (OTM) fault, a two-teeth-missing (TTM) fault, a chipped fault, or a cracked fault, e.g., on Gear 1 mounted on the low-speed shaft (e.g., input shaft 362).

Exemplary DHCNN Architecture

The following setup can be used to generate the exemplary results. The exemplary results are based on experiments conducted continuously for 100 minutes under each of the five fault types. The system recorded three-phase stator and rotor current signals for 100 seconds as one raw data record with an interval of 20 seconds between two consecutive data records, resulting in 50 raw data samples under each fault type. To increase the size of the training/test dataset, a simple data augmentation technique can be used to increase the number of data samples, which slices the raw data samples with stride. For example, a 100-second raw data sample can be sliced to 36 data samples of 30-second length with a stride time at 2 seconds. Thus, there can be 1800 data samples for each fault type, which can result in 9000 total data samples. These data samples can be randomly shuffled and split into training, validation, and test datasets, which can contain 70%, 20%, and 10% of the augmented data samples, respectively.

To conserve as much as fault information as possible, the frequency range of FFT spectrum whose magnitudes are fed into the CNN model can be chosen to be twice the magnitude of the maximum frequencies in $f_i'$. The parameters of this exemplary DHCNN are summarized in FIG. 5A.

Figure 5A:
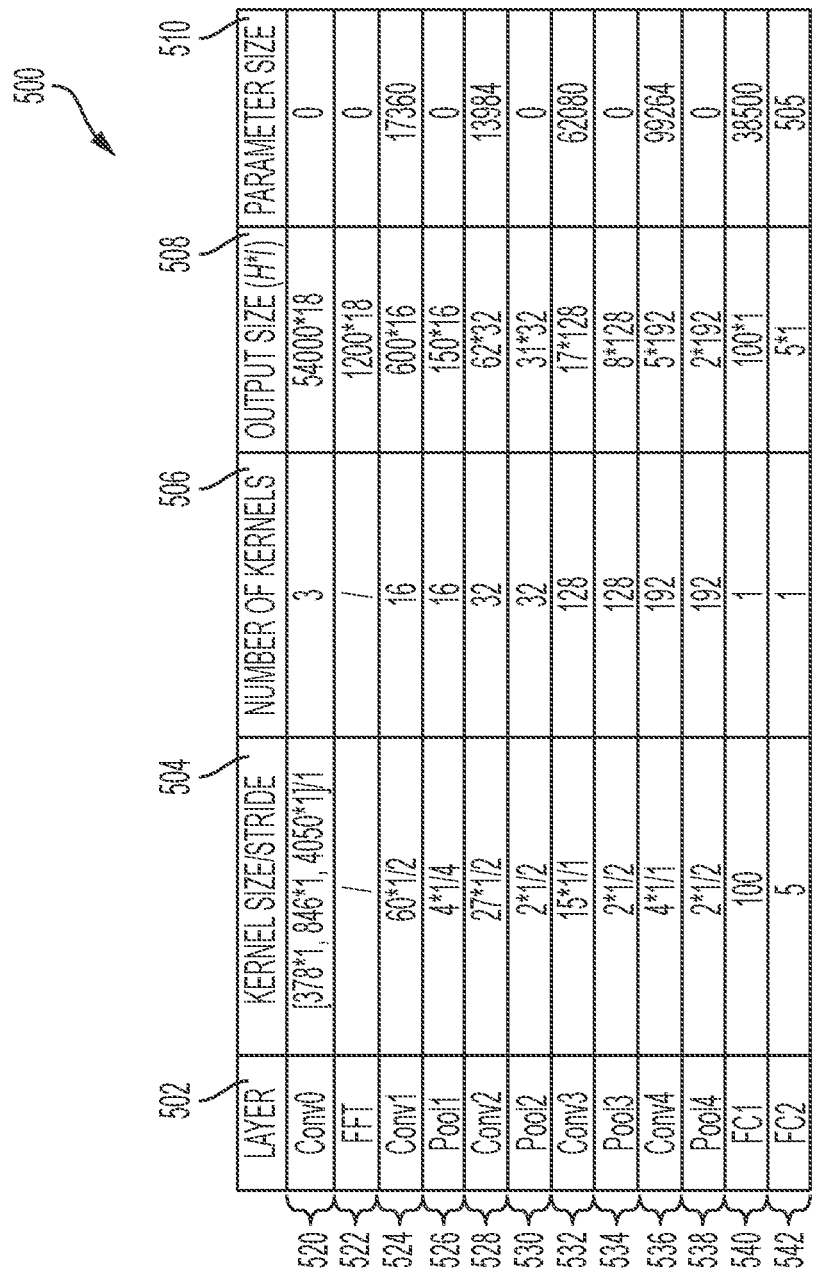
FIG. 5A depicts a table with a summary of parameters used in an exemplary DHCNN, including as a result of using a fault-amplifying convolutional layer in a physics-based module, in accordance with an embodiment of the present application.

FIG. 5A depicts a table 500 with a summary of parameters used in an exemplary DHCNN, including as a result of using a fault-amplifying convolutional layer in a physics-based module, in accordance with an embodiment of the present application. Table 500 can indicate the details of the architecture of an exemplary DHCNN. Table 500 can include multiple entries for each layer, where each entry can include (column) information relating to: a respective layer 502; a kernel size/stride 504; a number of kernels 506; an output size (H*I) 508; and a parameter size 510. An entry 520 can correspond to a "Conv0" layer (e.g., fault-amplifying convolutional layer 226 of physics-based module 220 of FIG.

2). An entry 522 can correspond to the FFT (e.g., FFT spectrum 228 shown as the output of physics-based module 220 of FIG. 2). Subsequent entries 524-538 can correspond to the multiple convolutional layers and pooling layers (e.g., 244 of deep CNN module 240 of FIG. 2). Entries 540-542 can correspond to the fully-connected (FC) layers (e.g., 246 of deep CNN module 240 of FIG. 2).

Table 500 demonstrates that the length of the output size (column 508, "H") gradually decreases through the Cony and Pool layers, while the depth of the output size (column 508 "I") keeps increasing. The exemplary DHCNN can contain 231,693 parameters in total, including 230,957 trainable and 736 non-trainable parameters. The training process can be implemented using Keras with Tensorflow backend.

Figure 4:
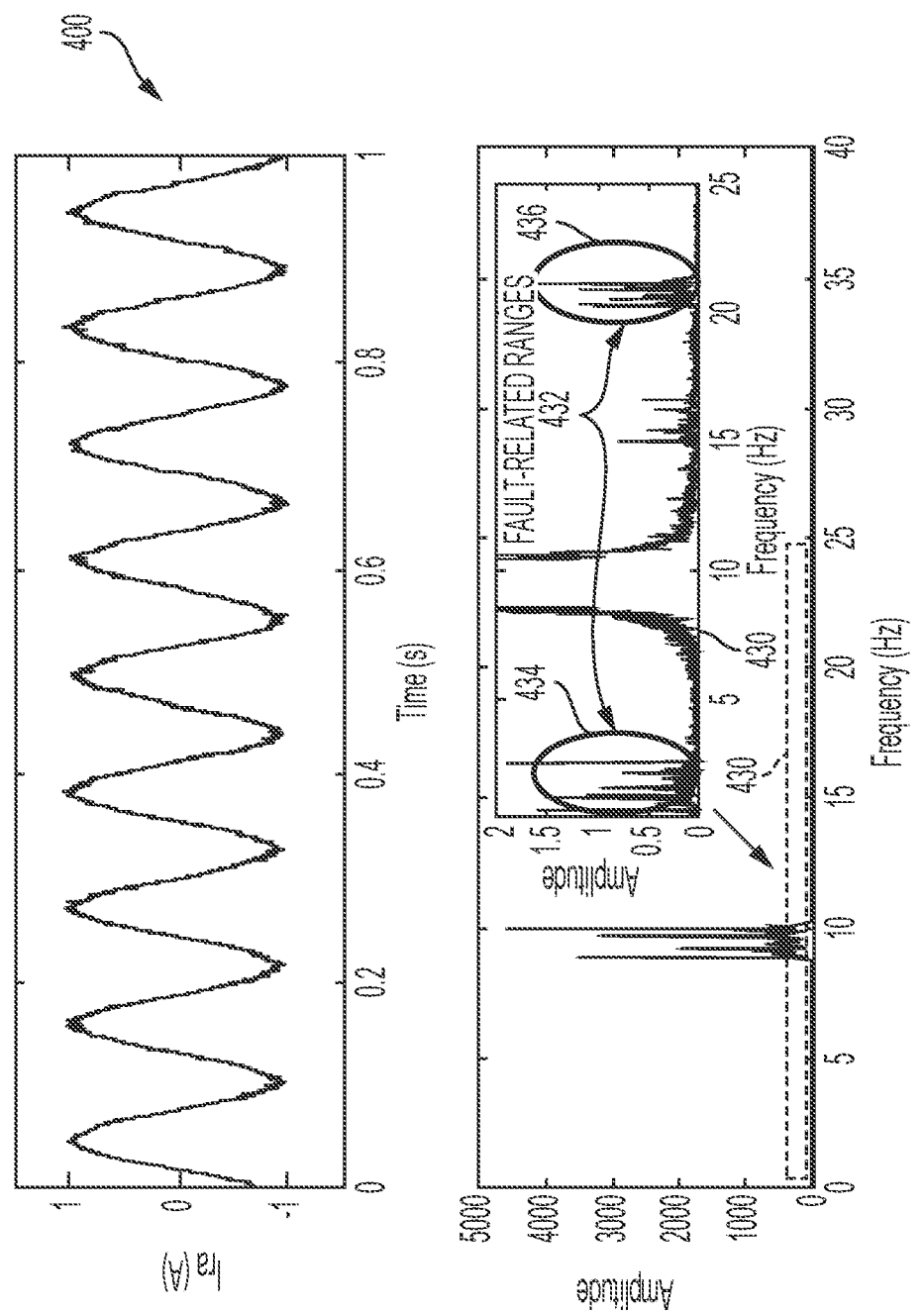
FIG. 4 depicts a diagram of a one-second augmented data sample with a two teeth missing (TTM) fault and its fast Fourier Transform (FFT) spectrum, in accordance with an embodiment of the present application.

Exemplary Results Using Physics-Based Module and Fault-Amplifying Convolutional Layer FIG. 4 depicts a diagram 400 of a one-second augmented data sample with a TTM fault and its FFT spectrum, in accordance with an embodiment of the present application. Diagram 400 depicts part of one data sample $I_{ra}(t)$ augmented (top portion) from a one-phase rotor current collected under a TTM fault and its FFT spectrum. In FIG. 4, the fundamental component is clearly identified (in the middle portion of a box 430) and its frequency can vary in the range of 8 to 10 Hertz (Hz) due to the varying shaft speed. At the same time, the visual indicator for the fault-related information is nearly impossible to detect. Indeed, the fault-related information (e.g., fault-related ranges 432, which can include fault-related information 434 and 436) can barely be seen in the smeared ranges appearing in the enlarged FFT spectrum. This demonstrates that the raw data sample has a very low SNR.

In the embodiments described herein, the system can eliminate the fundamental frequency and retain the non-stationary fault-related frequencies, e.g., by collecting the current signals, demodulating the collected current signals to obtain current envelope signals, resampling the current envelope signals to convert the non-stationary fault-related frequencies to the constant frequency components, and enlarging the resampled envelope signals to build kernels based on amplitudes at the constant frequency. An exemplary method for performing this signal processing procedure is described above in relation to FIG. 2 and below in relation to FIG. 6.

FIG. 5B depicts a table 550 with a comparison of accuracy and standard deviation of four different methods, in accordance with an embodiment of the present application. Table 550 can include entries 560-566, and each entry can indicate a structure 552, an average accuracy 554, and a standard deviation 556. For example, entry 560 can correspond to the DHCNN of the described embodiments, and indicates the highest average accuracy (99.54%) and the lowest standard deviation (0.25%) of the four depicted methods. Entry 562 can correspond to "DCNN1," which is a conventional CNN structure which takes the raw data sample as the input, without the physics-based module. Entry 564 can correspond to "DCNN2," which is a DHCNN without the fault-amplifying convolutional layer (i.e., Conv0). Entry 566 can correspond to a traditional feed-forward artificial neural network (ANN). Thus, table 550 demonstrates that the described embodiments of the DHCNN have the highest accuracy and robust performance for fault diagnosis. In addition, the average accuracy of DCNN1 is significantly lower than the other methods, while the standard deviation of DCNN1 is significantly higher than the other methods. This demonstrates that the physics-based module can be critical or important for achieving high accuracy and robustness in fault diagnosis.

Furthermore, by employing the physics-based module in the embodiments of the DHCNN described herein, the system can provide an improvement in the analysis and diagnosis of fault-related information by using the operational context of the system (e.g., identifying the gearbox of a wind turbine as a common failure point in a component of a rotating machine system) rather than relying on pure machine learning (as in the conventional CNNs). Specifically, by using the hybrid approach of the physics-based module (including the fault-amplifying module) with the deep CNN, the described embodiments can result in an improved fault diagnosis for the broad class of rotating machine systems.

Figure 5C:
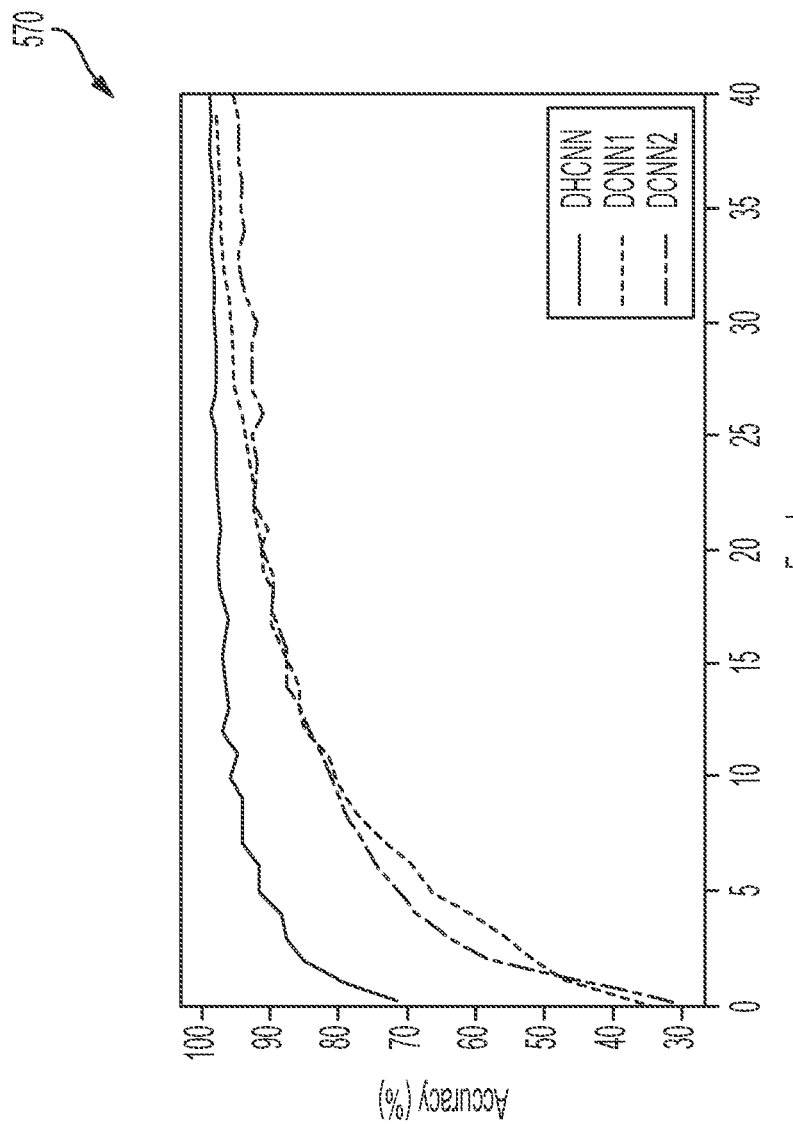
FIG. 5C depicts a plot with exemplary accuracy curves for some of the methods listed in FIG. 5B, in accordance with an embodiment of the present application.

FIG. 5C depicts a plot 570 with exemplary accuracy curves for some of the methods listed in FIG. 5B, in accordance with an embodiment of the present application. Plot 570 indicates that the training accuracy of all three listed methods (DHCNN, DCNN1, and DCNN2) can reach stable values with the increasing of epochs, while DHCNN has the highest accuracy in the end. Moreover, the described embodiments of the DHCNN have a much higher accuracy in the beginning, and can converge more quickly than DCNN1 and DCNN2 due to the use of Conv0 in the physics-based module. Thus, the utilization of Conv0 can provide the DHCNN with more fault information without training, which in turn can lead to quicker and more accurate diagnosis results, especially in time-sensitive systems. These improvements demonstrate that the described DHCNN can be better for quicker and more efficient learning and can be implemented in real time for online adaptation.

Exemplary Method for Facilitating Fault Diagnosis

Figure 6:
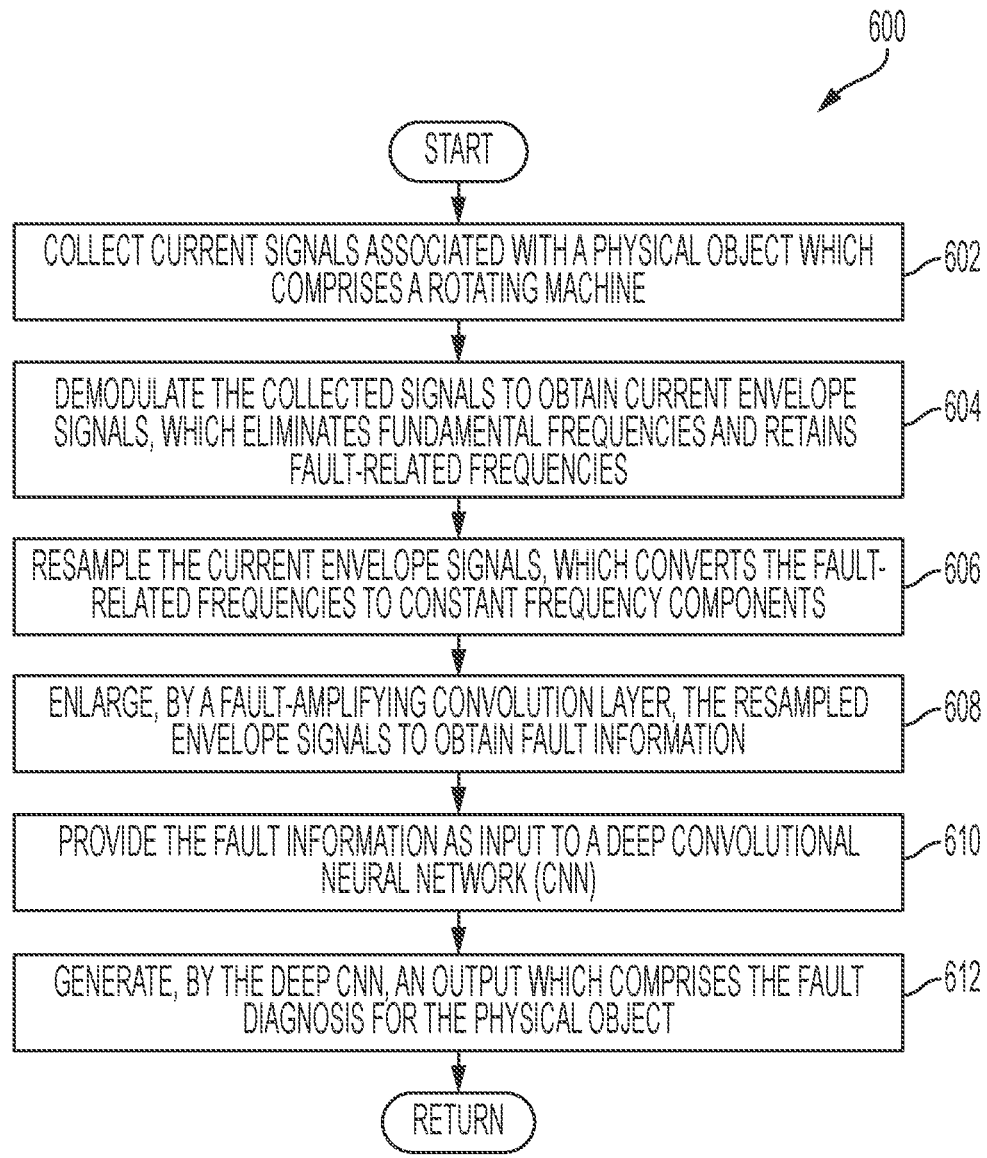
FIG. 6 presents a flowchart illustrating a method for facilitating fault diagnosis, in accordance with an embodiment of the present application.

FIG. 6 presents a flowchart 600 illustrating a method for facilitating fault diagnosis, in accordance with an embodiment of the present application. During operation, the system collects current signals associated with a physical object which comprises a rotating machine (operation 602). The system demodulates the collected signals to obtain current envelope signals, which eliminates fundamental frequencies and retains fault-related frequencies (operation 604). The system resamples the current envelope signals, which converts the fault-related frequencies to constant frequency components (operation 606). The system enlarges, by a fault-amplifying convolution layer, the resampled envelope signals to obtain fault information (operation 608). The system provides the fault information as input to a deep convolutional neural network (CNN) (operation 610). The system generates, by the deep CNN, an output which comprises the fault diagnosis for the physical object (operation 612). This deep CNN can comprise a deep hybrid CNN (DHCNN) based on the physics-based module which includes the fault-amplifying convolutional layer.

Exemplary Computer and Communication System

Figure 7:
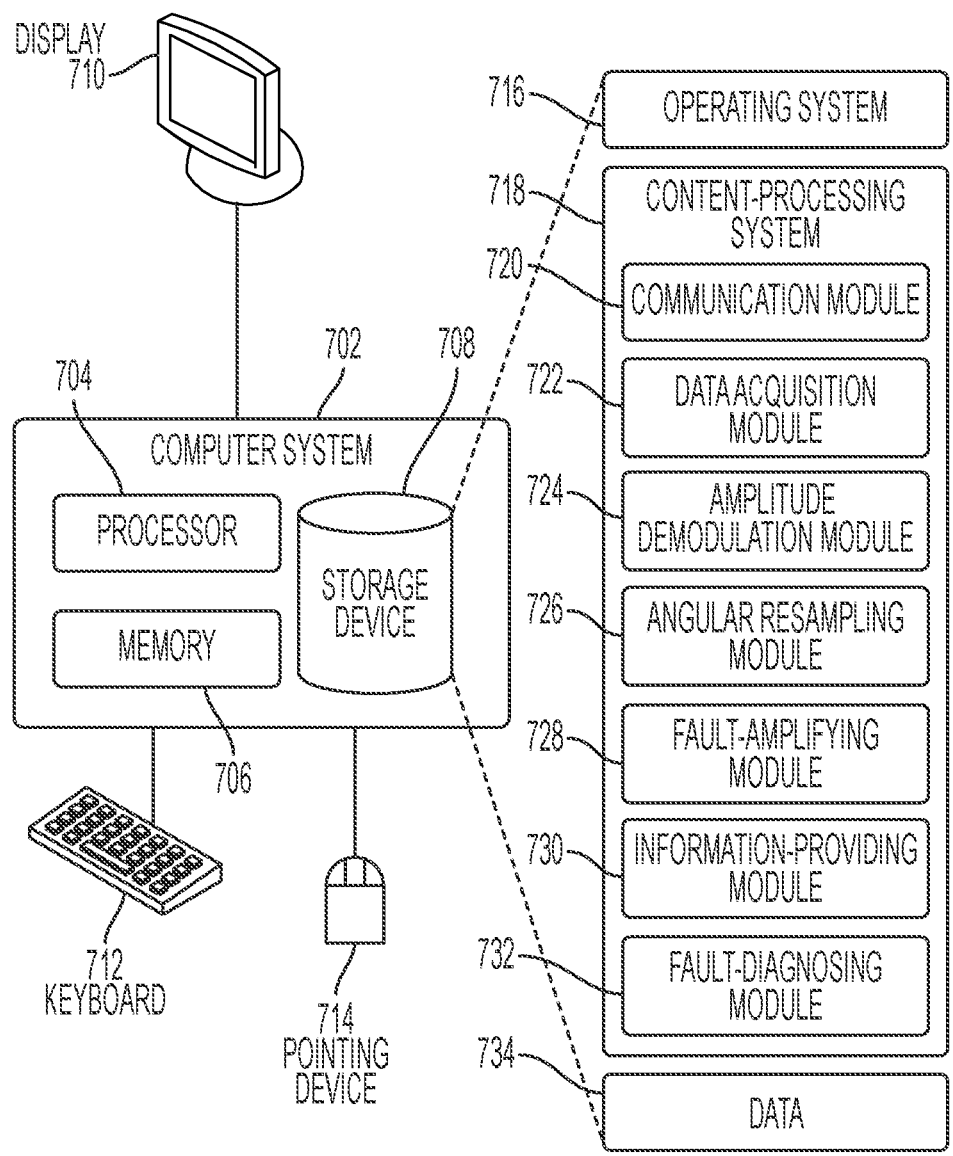
FIG. 7 presents an exemplary computer and communication system which facilitates fault diagnosis, in accordance with an embodiment of the present application.

FIG. 7 presents an exemplary computer and communication system which facilitates fault diagnosis, in accordance with an embodiment of the present application. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 734.

Content-processing system 718 can include instructions, which when executed by computer system 702, can cause computer system 702 to perform methods and/or processes described in this disclosure. Specifically, content-processing system 718 may include instructions for sending and/or receiving data packets to/from other network nodes across a computer network (communication module 720). A data packet can include data, a request, a command, time series data, training data, and a fault diagnosis or a fault classification.

Content-processing system 718 can further include instructions for collecting current signals associated with a physical object which comprises a rotating machine (communication module 720 and data acquisition module 722). Content-processing system 718 can include instructions for demodulating the collected signals to obtain current envelope signals, which eliminates fundamental frequencies and retains fault-related frequencies (amplitude demodulation module 724). Content-processing system 718 can include instructions for resampling the current envelope signals, which converts the fault-related frequencies to constant frequency components (angular resampling module 726). Content-processing system 718 can include instructions for enlarging, by a fault-amplifying convolution layer, the resampled envelope signals to obtain fault information (fault-amplifying module 728). Content-processing system 718 can include instructions for providing the fault information as input to a deep convolutional neural network (CNN) (communication module 720 and information-providing module 730). Content-processing system 718 can include instructions for generating, by the deep CNN, an output which comprises the fault diagnosis for the physical object (fault-diagnosing module 732).

Data 734 can include any data that is required as input or that is generated as output by the methods and/or processes described in this disclosure. Specifically, data 734 can store at least: data; a set of data; data representing current signals; an indicator or identifier of a physical object or rotating machine; demodulated signals; current envelope signals; a fundamental frequency; a fault-related frequency; resampled signals; constant frequency components; enlarged or amplified signals; fault information; information associated with or relating to a CNN, DCNN, or DHCNN; an output; a fault diagnosis; a fault type or a fault classification; an FFT spectrum; an indicator of a physics-based module, an amplitude demodulation module, an angular resampling module, and a fault-amplifying module; an indicator or identifier of a convolutional layer, a batch normalization, a pooling layer, or a fully connected layer; and a fault type.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for facilitating fault diagnosis, the method comprising:
    collecting current signals associated with a physical object which comprises a rotating machine;
    demodulating the collected signals to obtain current envelope signals, which eliminates fundamental frequencies and retains fault-related frequencies;
    resampling the current envelope signals, which converts the fault-related frequencies to constant frequency components;
    enlarging, by a fault-amplifying convolution layer, the resampled envelope signals to obtain fault information;
    providing the fault information as input to a deep convolutional neural network (CNN); and
    generating, by the deep CNN, an output which comprises the fault diagnosis for the physical object.

2. The method of claim 1, wherein the rotating machine comprises one or more of:
    a wind turbine;
    a wind turbine gearbox;
    a machine which includes a rotating shaft; and
    a machine which includes one or more rotating components and at least one component from which current signals can be collected or obtained.

3. The method of claim 1,
    wherein demodulating the collected signals, resampling the current envelope signals, enlarging the resampled envelope signals, and providing the fault information as input to the deep CNN are performed by a physics-based module.

4. The method of claim 3,
    wherein demodulating the collected signals is performed by an amplitude demodulation module of the physics-based module and is based on a Hilbert transform, and
    wherein the retained fault-related frequencies are non-stationary fault-related frequencies.

5. The method of claim 3,
    wherein resampling the current envelope signals is performed by an angular resampling module of the physics-based module and is based on an angular resampling algorithm,
    wherein the angular resampling algorithm is based on an order tracking method, and
    wherein the resampled envelope signals have equal phase increments in an angle domain, thereby eliminating spectrum smearing.

6. The method of claim 3,
    wherein the physics-based module includes the fault-amplifying convolutional layer, and
    wherein enlarging the resampled envelope signals further comprises:
        building, by the fault-amplifying convolution layer, kernels based on amplitudes corresponding to the constant frequency components; and
        extracting features by measuring similarities between the kernels and a local input signal.

7. The method of claim 1, wherein providing the fault information as input to the deep CNN further comprises:
    performing a fast Fourier transform (FFT) analysis on the enlarged resampled envelope signals,
    wherein the fault information provided to the deep CNN comprises magnitudes of a predetermined frequency range, and
    wherein the predetermined frequency range is configured by a system or a user associated with the rotating machine.

8. The method of claim 1,
    wherein the deep CNN processes the fault information based on zero padding, batch normalization, and a plurality of pooling layers subsequent to a plurality of convolutional layers.

9. The method of claim 8,
    wherein the deep CNN processes the fault information further based on two fully-connected layers by using a softmax function to determine conditional probabilities for a health condition of the rotating machine, and
    wherein the fault diagnosis includes a fault classification related to the health condition of the rotating machine.

10. A computer system for facilitating fault diagnosis, the computer system comprising:
    a processor; and
    a storage device storing instructions that when executed by the processor cause the processor to perform a method, the method comprising:
        collecting current signals associated with a physical object which comprises a rotating machine;
        demodulating the collected signals to obtain current envelope signals, which eliminates fundamental frequencies and retains fault-related frequencies;
        resampling the current envelope signals, which converts the fault-related frequencies to constant frequency components;
        enlarging, by a fault-amplifying convolution layer, the resampled envelope signals to obtain fault information;
        providing the fault information as input to a deep convolutional neural network (CNN); and
        generating, by the deep CNN, an output which comprises the fault diagnosis for the physical object.

11. The computer system of claim 10, wherein the rotating machine comprises one or more of:
    a wind turbine;
    a wind turbine gearbox;
    a machine which includes a rotating shaft; and
    a machine which includes one or more rotating components and at least one component from which current signals can be collected or obtained.

12. The computer system of claim 10,
    wherein demodulating the collected signals, resampling the current envelope signals, enlarging the resampled envelope signals, and providing the fault information as input to the deep CNN are performed by a physics-based module.

13. The computer system of claim 12,
wherein demodulating the collected signals is performed by an amplitude demodulation module of the physics-based module and is based on a Hilbert transform, and
wherein the retained fault-related frequencies are non-stationary fault-related frequencies.

14. The computer system of claim 12,
wherein resampling the current envelope signals is performed by an angular resampling module of the physics-based module and is based on an angular resampling algorithm,
wherein the angular resampling algorithm is based on an order tracking method, and
wherein the resampled envelope signals have equal phase increments in an angle domain, thereby eliminating spectrum smearing.

15. The computer system of claim 12,
wherein the physics-based module includes the fault-amplifying convolutional layer, and
wherein enlarging the resampled envelope signals further comprises:
building, by the fault-amplifying convolution layer, kernels based on amplitudes corresponding to the constant frequency components; and
extracting features by measuring similarities between the kernels and a local input signal.

16. The computer system of claim 10, wherein providing the fault information as input to the deep CNN further comprises:
performing a fast Fourier transform (FFT) analysis on the enlarged resampled envelope signals,
wherein the fault information provided to the deep CNN comprises magnitudes of a predetermined frequency range, and
wherein the predetermined frequency range is configured by a system or a user associated with the rotating machine.

17. The computer system of claim 10,
wherein the deep CNN processes the fault information based on zero padding, batch normalization, and a plurality of pooling layers subsequent to a plurality of convolutional layers.

18. The computer system of claim 17,
wherein the deep CNN processes the fault information further based on two fully-connected layers by using a softmax function to determine conditional probabilities for a health condition of the rotating machine, and
wherein the fault diagnosis includes a fault classification related to the health condition of the rotating machine.

19. A deep hybrid convolutional neural network (DHCNN), comprising:
a data acquisition module configured to collect current signals associated with a physical object which comprises a rotating machine;
a fault-amplifying convolution layer of a physics-based module,
wherein the fault-amplifying convolutional layer is configured to enlarge resampled envelope signals based on the collected current signals to obtain fault information; and
an information-providing module configured to provide the fault information as input to a deep convolutional neural network (CNN),
wherein the DHCNN is configured to generate an output which comprises the fault diagnosis for the physical object.

20. The deep hybrid convolutional neural network (DHCNN) of claim 19, further comprising:
the physics-based module which comprises an amplitude demodulation module, an angular resampling module, the fault-amplifying convolutional layer, and the information-providing module,
wherein the amplitude demodulation module is configured to demodulate the collected signals to obtain current envelope signals, which eliminates fundamental frequencies and retains fault-related frequencies, and
wherein the angular resampling module is configured to resample the current envelope signals, which converts the fault-related frequencies to constant frequency components, to obtain the resampled envelope signals.

* * * * *